United States Patent [19]

Durand

[11] Patent Number: 4,828,205
[45] Date of Patent: May 9, 1989

[54] DEVICE FOR CARRYING AND LIFTING LOADS AND MOVING SAME BY AERODYNAMIC LIFTING

[75] Inventor: Roger Durand, Marseille, France

[73] Assignee: Societe Civile d'Etudes et de Prototypes Industriels et de Series, France

[21] Appl. No.: 121,305

[22] Filed: Nov. 16, 1987

[51] Int. Cl.⁴ .............................................. B64C 27/10
[52] U.S. Cl. ................................ 244/17.23; 244/69; 244/23 R; 416/128; 416/129
[58] Field of Search ................ 244/23 R, 23 A, 17.23, 244/69; 416/128, 129, 170 R, 189, 201 R

[56] References Cited

U.S. PATENT DOCUMENTS 2,711,295  6/1955  Peterson ............................ 244/7 R
3,064,925  11/1962  Preston .............................. 244/17.23
3,606,570  9/1971  Haggerty ........................... 244/23 A Primary Examiner—Joseph F. Peters, Jr.
Assistant Examiner—Rodney Corl
Attorney, Agent, or Firm—Robert J. Koch

[57] ABSTRACT

The disclosure describes a device for carrying and lifting loads and moving same by aerodynamic lifting, rotary-wing aerial propulsion, having two coaxial rotors of same diameters rotating at the same speed and in reversed direction through a double crown wheel system which is driven by oppositely disposed rollers. The device includes a crown wheel operatively connected to two rotors which are driven by two rollers, one of which being driven by one or two motors mounted on the body. The internal crown wheel has a hub enabling external blades to be mounted in superimposed relationship.

6 Claims, 1 Drawing Sheet

DEVICE FOR CARRYING AND LIFTING LOADS AND MOVING SAME BY AERODYNAMIC LIFTING

BACKGROUND OF THE INVENTION

1. Field of Invention

The object of the invention concerns a device for carrying and lifting loads and moving same by areodynamic lift.

It is intended to take off and aerial lift, either to produce displacements, or to immobilize weight masses at a certain height in order to move them.

2. Description of the Related Technology

It is known to use apparatuses of this type provided with one or two rotors, but to this day the driving of the two propellers and the control thereof required heavy and complicated mechanical means making these devices industrially unusable for carrying loads as well as people, in view of difficulties of operation and power transmission as well as because of the absence of security.

SUMMARY OF THE INVENTION

The device according to the invention overcomes these disadvantages since it includes a double coaxial rotor which gets rid of the tail of the apparatus and enables to reduce its dimension and to increase the weight volume ratio; moreover, these two rotors have carrying capacity, their torques compensate one another and prevent any lost of energy in the anti-torque function, which increases the power and thereby the lifting capacity. These rotors are coaxial and contrarotating, and have the same diameter so as to prevent the air jet from being rotated and to enable the energy to be entirely available for lifting; finally, there is no more gyroscopic effects inducing dissymetrical torques between the pitch and roll movements, which facilitates flying.

It is made of the combination of two superimposed propellers or horizontal rotors of the same diameter which are mounted on the same shaft but which rotate in reversed direction and at the same speed. It also comprises a driving device made of oppositely placed rollers mounted on the same step to drive concentric crown wheels carrying superimposed rotary-wings, and finally a carrying and directional wing.

BRIEF DESCRIPTION OF DRAWINGS

In the enclosed drawings, given by way of non-limiting example, of one of the embodiments of the object of the invention.

DETAILED DESCRIPTION OF THE PREFERRED EMBODIMENTS

Figure 1:
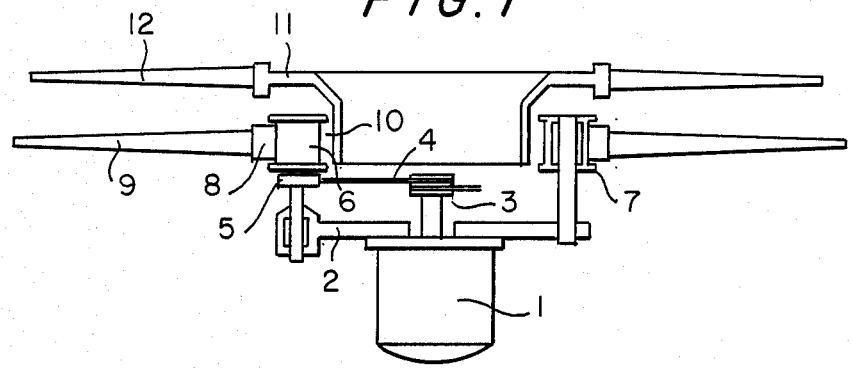
FIG. 1 represents the apparatus as a whole illustrated in elevation.

The apparatus is provided with a motor 1, fixedly mounted on the main body 2, which drives pulleys 3 and 5 which are connected by means of belts 4 to driving rollers 6 whose axes are parallel to the main axis.

Two crown wheels rest against these rollers, one being an external wheel 8 which is in contact with the outermost generator of the rollers, the other one being an internal crown wheel 10 which is in contact with the innermost generator of the rollers and which is consequently driven in opposite direction with respect to the external crown wheel.

The external crown wheel is provided with carrying blades 9 which are mounted on its outer periphery. The internal crown wheel 10 comprises an extension or hub 11 which enables to fixedly mount the blades 12 also outwardly, which is one of the characteristics of the invention.

The blades 9 and 12, suitably at dead pitch, ensure the aerodynamic lift of the apparatus.

The power is transmitted to the crown wheels 8 and 10 and through the latter to the rollers 6, as well as to the other rollers 7 which are merely carriers and which together with the rollers 7 serve to ensure the actual and radial guiding of the two crown wheels and to transmit the carrying forces to the main body 2 which takes up the loads.

If the rotation speed of the external crown wheel is less than that of the internal crown wheel, this difference can be corrected by the number of blades and with higher pitch.

Figure 4:
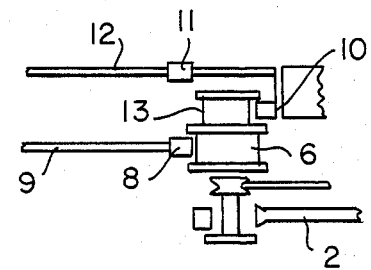

The internaal crown wheel 10 rests on a second set of rollers 13 which are unitary with the driving rollers 6 or carrying rollers 7, but are of smaller diameter, (FIG. 4), in order to obtain the same rotation speed. They thus ensure the same lifting capacity.

Figure 3:
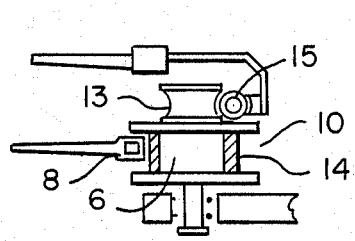
FIGS. 3 and 4 represent at a different scale the construction details of the driving mechanism.

A ring 15 (FIG. 3) can be mounted on the crown wheel. It comprises a cavity filled with air under pressure which makes it flexible like a vehicle tire.

The result is thus better driving, wear reduction and an improvement in connection with sonority.

Figure 5:
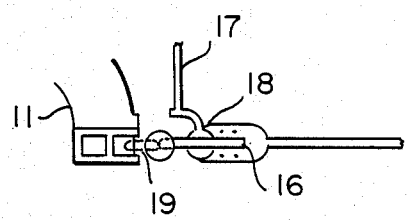
FIG. 5 shows an arrangement of a mechanically articulated blade.

The blade 9 or 12 (FIG. 5) is freely rotatable on a shaft 16 and comprises a control lever 17 actuated by a small rod 18. The shaft 16 is articulated by oscillation on a link 19 which is also articulated, and is driven by the crown wheel 8 or 11.

The result is that it is thus possible to fly in altitude, in longitudinal and lateral direction and inclination, all this being associated with longitudinal, lateral displacements or turning.

Figure 2:
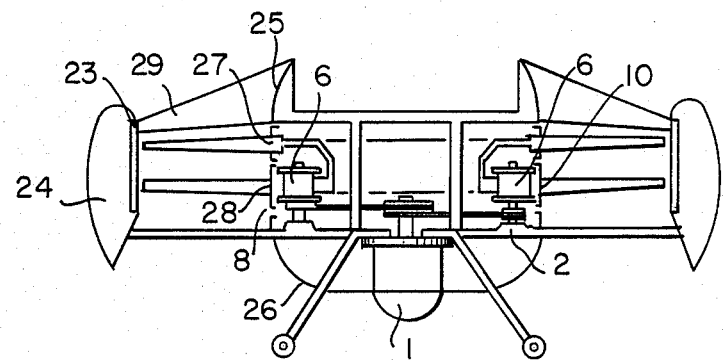
FIG. 2 is a view in elevation of the directional and carrying crown wheel.

The outer streamlining (FIG. 2) limits the outer shape of the air jet which passes through the rotors. It comprises a resistant portion 23 and an adjoining portion 24 of a shape approriate to suit its purpose.

The annular air jet is limited in its internal portion by the covers 25 and 26 which are associated with the body 2 and the rotary cylindrical portions 27, 28 which are fixed to the rotors in the vicinity of the inner parts of the blades. The outer contour is made unitary with the central body by means of substantially radial wings 29 and 30.

It is theoretically and practically known that such a type of outer streamlining improves the performances of a given rotor, by the effect of "diffusion" on the portion of the jet which exits downstream, which increases its cross-section and therefore slows it down, by increasing the thrust. For a given power, a streamlined rotor supplies a higher lift, such as the one which would be obtained with a rotor of larger diameter.

Thus, the addition of a streamlining not only improves the security, but also the performance with respect to the load that can be taken off. It should also be noted that it is possible to complete the device at the lower part by means of a suitably formed flexible skirt which for utilization close to the ground would convert this machine into an apparatus on "air cushion" which, as is well known, requires only a very low power input to lift a given load.

Figure 6:
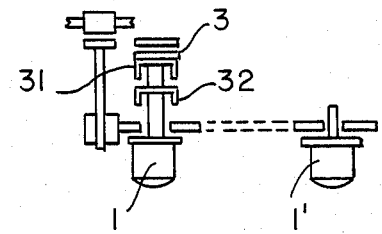
FIG. 6 represents a construction variant with two propelling motors.

Again for reasons of security, it is currently known to mount a plurality of motors on aerodynes in order to obviate any breakdown of one of them (FIG. 6).

The motors 1,1' are mounted eccentrically on the body 2 and to enable them to be started separately, or to ensure a continuous operation if one of them eventually stops. The motors drive the pulleys 3, the rollers and the crown wheels by means of a coupling 32 and a freely rotable wheel 31, or a combination thereof. These devices as well as their operation are well known.

Each motor can thus drive one or more rollers so as to better distribute the energy required to drive the crown wheels.

On the other hand, the eccentric position of the motors frees the central portion of the apparatus, which can be used for mounting certain loads which are then perfectly centered.

I claim:

1. A device for carrying, lifting, and moving loads by aerodynamic lifting, rotary-wing aerial propulsion, comprising:
    a first set and a second set of coaxial rotors of equal diameter producing an annular air jet;
    an internal crown wheel fixed to said first set of coaxial rotors;
    an external crown wheel fixed to said second set of coaxial rotors, said internal crown wheel in the form of a hub positioned inside said external crown wheel so that the plane of said first set of rotors is positioned parallel to the plane of said second set of rotors;
    a first driving roller means positioned between and contacting said internal and said external crown wheels, said first driving roller means driven by at least one motor,
    a second roller means, opposingly positioned from said first driving roller means, positioned between and contacting said internal and said external crown wheels so that said coaxial rotors rotate at the same speed and in opposite directions.

2. A device according to claim 1 wherein said first driving roller means further comprises a pair of coaxially linked rollers of different diameters proportioned to compensate for the size differential between said internal crown wheel and said external crown wheel so as to equalize the rotation speeds of said first set and said second set of coaxial rotors.

3. A device according to claim 1 wherein said coaxial rotors further comprise blades moveably mounted on said crown wheels and control means for varying the pitch of said blades, associated with said blades.

4. A device according to claim 1 further comprising: a fixedly mounted protecting streamlining member and covers to limit said annular air jet produced from said coaxial rotors.

5. A device according to claim 2 wherein said crown wheel further comprises a flexible ring disposed against said crown wheel.

6. A device according to claim 5 wherein at least one of said coaxially linked rollers comprises a flexible ring disposed against said roller.

* * * * *